US010988419B2

(12) United States Patent
Abu Rabeah et al.

(10) Patent No.: US 10,988,419 B2
(45) Date of Patent: Apr. 27, 2021

(54) BINDERS FOR THE GRANULATION OF FERTILIZERS

(71) Applicant: Dead Sea Works Ltd., Beer Sheva (IL)

(72) Inventors: Khalil Abu Rabeah, Beersheba (IL); Ruben Socolovsky, Beersheba (IL); Natalia Geinik, Arad (IL); Ayoub Alhowashla, Hora (IL); Joseph Lati, Lehavim (IL)

(73) Assignee: Dead Sea Works Ltd., Beer Sheva (IL)

( * ) Notice: Subject to any disclaimer, the term of this patent is extended or adjusted under 35 U.S.C. 154(b) by 0 days.

(21) Appl. No.: 16/343,900

(22) PCT Filed: Oct. 23, 2017

(86) PCT No.: PCT/IB2017/056572
§ 371 (c)(1),
(2) Date: Apr. 22, 2019

(87) PCT Pub. No.: WO2018/073815
PCT Pub. Date: Apr. 26, 2018

(65) Prior Publication Data
US 2020/0055795 A1    Feb. 20, 2020

Related U.S. Application Data

(60) Provisional application No. 62/411,579, filed on Oct. 22, 2016.

(51) Int. Cl.
C05G 5/12      (2020.01)
C05D 1/00      (2006.01)
C05G 3/20      (2020.01)

(52) U.S. Cl.
CPC .............. *C05G 5/12* (2020.02); *C05D 1/005* (2013.01); *C05G 3/20* (2020.02)

(58) Field of Classification Search
None
See application file for complete search history.

(56) References Cited

U.S. PATENT DOCUMENTS

| | | | |
|---|---|---|---|
| 2,138,827 A | 12/1938 | Bailey | |
| 3,332,470 A | 7/1967 | Chirico | |
| 3,332,827 A | 7/1967 | Griffith | |
| 3,532,621 A | 10/1970 | Hough | |
| 3,548,046 A | 12/1970 | Savage | |
| 3,711,254 A | 1/1973 | McGowan | |
| 3,876,387 A | 4/1975 | Coulson | |
| 3,877,920 A | 4/1975 | Carlberg | |
| 4,283,423 A | 8/1981 | Watkins | |
| 4,963,231 A | 10/1990 | Ryham | |
| 5,112,379 A | 5/1992 | Young | |
| 5,651,888 A | 7/1997 | Shimizu | |
| 6,287,496 B1 | 9/2001 | Lownds | |
| 6,454,979 B1 * | 9/2002 | Phinney | B01J 2/14 264/117 |
| 2002/0121117 A1 | 9/2002 | Hartmann | |
| 2004/0139992 A1 | 7/2004 | Murkute | |
| 2005/0072724 A1 | 4/2005 | Nakayama | |
| 2005/0276905 A1 | 12/2005 | Xing | |
| 2006/0144789 A1 | 7/2006 | Cath | |
| 2008/0223098 A1 * | 9/2008 | Taulbee | C05C 1/02 71/61 |
| 2009/0261040 A1 | 10/2009 | Pruet | |
| 2009/0272692 A1 | 11/2009 | Kurth | |
| 2010/0213129 A1 | 8/2010 | Jones | |
| 2010/0224476 A1 | 9/2010 | Cath | |
| 2011/0017666 A1 | 1/2011 | Cath | |
| 2011/0064853 A1 | 3/2011 | Maeki | |
| 2011/0123420 A1 * | 5/2011 | Phinney | C01D 3/08 423/197 |
| 2011/0257788 A1 | 10/2011 | Wiemers | |
| 2011/0315632 A1 | 12/2011 | Freije, III | |
| 2013/0001162 A1 | 1/2013 | Yangali-Quintanilla | |
| 2013/0264260 A1 | 10/2013 | Heinzl | |
| 2014/0001122 A1 | 1/2014 | Schultz | |
| 2014/0175011 A1 | 6/2014 | Benton | |
| 2014/0223979 A1 | 8/2014 | Wiseman | |
| 2014/0245803 A1 | 9/2014 | Forsythe | |
| 2015/0014232 A1 | 1/2015 | McGinnis | |
| 2015/0101987 A1 | 4/2015 | Yeh | |

(Continued)

FOREIGN PATENT DOCUMENTS

| | | |
|---|---|---|
| CN | 1091990 A | 9/1994 |
| CN | 1387497 | 12/2002 |
| CN | 1485124 | 3/2004 |

(Continued)

OTHER PUBLICATIONS

Bryan D. Coday et al., "The sweet spot of forward osmosis: Treatment of produced water, drilling wastewater, and other complex and difficult liquid streams" Desalination 333 (2014) 23-35.

Canadian Office Action dated Jul. 12, 2018 for corresponding CA Patent App. No. 2,890,360, 5 pages.

Extended European Search Report for Application No. 16789406.2 dated Dec. 14, 2018, 8 pages.

Indian Examination Report dated Jun. 28, 2018 for in Application No. 829DELNP2015, 6 pages.

International Search Report and Written Opinion dated Dec. 19, 2013 for corresponding International Patent Application No. PCT/US2013/049166. 7 pages.

(Continued)

*Primary Examiner* — Wayne A Langel

(74) *Attorney, Agent, or Firm* — Graeser Associates International Inc.; D'vorah Graeser

(57)  ABSTRACT

According to some demonstrative embodiments, there is provided herein a fertilizer granule including a fertilizer dust and one or more binders wherein said granule comprises a single strength of at least 2.5 kg/gran and a single strength after humidity chamber 24 hours, 79% RH of at least 0.5 kg/granule.

9 Claims, No Drawings

(56) References Cited

U.S. PATENT DOCUMENTS

| | | | |
|---|---|---|---|
| 2016/0060182 A1* | 3/2016 | Cook | C05F 3/00 71/21 |
| 2017/0305805 A1 | 10/2017 | Farnworth | |

FOREIGN PATENT DOCUMENTS

| | | |
|---|---|---|
| CN | 106082279 A | 11/2016 |
| FR | 2583412 A1 | 12/1986 |
| GB | 935007 A | 8/1963 |
| GB | 1378938 | 12/1974 |
| GB | 2522490 | 7/2015 |
| GB | 2577865 | 4/2020 |
| JP | 2003112017 | 4/2003 |
| KR | 101335445 B1 | 12/2013 |
| SU | 695018 A1 | 6/1982 |
| SU | 990756 A | 1/1983 |
| SU | 1574542 A1 | 6/1990 |
| WO | 0121556 A1 | 3/2001 |
| WO | 2009086587 A1 | 7/2009 |
| WO | 2011053794 A2 | 5/2011 |
| WO | 2012109723 A1 | 8/2012 |
| WO | 2012115496 A1 | 8/2012 |
| WO | 2014181149 A2 | 11/2014 |
| WO | 2015185907 A1 | 12/2015 |
| WO | 2015185909 A1 | 12/2015 |
| WO | 2016051130 A1 | 4/2016 |
| WO | 2016178211 | 11/2016 |
| WO | 2018073815 | 4/2018 |
| WO | 2018109773 | 6/2018 |
| WO | 2018146684 | 8/2018 |

OTHER PUBLICATIONS

Office Action dated Jul. 3, 2018 for U.S. Appl. No. 15/559,424 (pp. 1-9).

Omeman, Z. et al, "Geopolymer cement in concrete: novel sustainable", Cemento-Hormigon , 78(906), 4-19 STNDatabase accession No. 2008:130694 XP002777656.

R. L. Earle., "Chapter 8: Evaporation. Multiple Effect Evaporation", Unit Operations in Food Processing, (19831231), URL: http://www.nzifst.org.nz/unitoperations/evaporation2.htm, XP055282974, 18 pages.

RU Office Action dated Jul. 31, 2019 for RU Application No. 2017141009 (4 pages).

RU Office Action dated May 15, 2017 for RU Application No. 2015103308 (9 pages).

RU Search Report dated May 5, 2017 for RU Application No. 2015103308 (2 pages).

Russian Search Report for Application No. RU2017141009, dated Jul. 10, 2019, 2 pages.

Unit Operations in Food Processing—R. L Earle, 1983, NZIFST, http://www.nzifst.org.nz/unitoperations/evaporation2.htm. 7 pages.

Written Opinion of the International Search Authority for parent PCT application PCT/IL2016/050436, 6 pages.

Written Opinion of the International Search Authority for parent PCT application PCT/IL2017/050358 dated Jun. 25, 2017, 6 pages.

Written Opinion of the International Search Authority for parent PCT application PCT/IL2014/050278, dated Sep. 14, 2015. 6 pages.

Database WPI, Week 198346 Thomson Scientific, London, GB; AN 1983-819450, XP002801001, & SU 990 756 A (Kaluga Khlorvinil) Jan. 23, 1983 (Jan. 23, 1983) (1 page).

Extended European Search Report for App. No. EP18751114.2, dated Nov. 20, 2020, 8 pages.

Notice of Allowance dated Sep. 16, 2020 for U.S. Appl. No. 16/481,183 (pp. 1-9).

Notice of Allowance dated Dec. 21, 2020 for U.S. Appl. No. 16/481,183 (pp. 1-2).

Office Action dated Aug. 4, 2020 for U.S. Appl. No. 15/570,753 (pp. 1-13).

Office Action dated Feb. 11, 2020, for U.S. Appl. No. 15/570,753 (pp. 1-9).

Office Action dated May 22, 2020 for U.S. Appl. No. 15/570,753 (pp. 1-11).

Chile Office Action (with English translation) for App. No. CL02247-2019, dated Jan. 7, 2021, 16 pages.

* cited by examiner

BINDERS FOR THE GRANULATION OF FERTILIZERS

FIELD OF THE INVENTION

The present invention relates to the field of fertilizers derived from any material of natural or synthetic origin that is applied to soils or to plant tissues to supply one or more plant nutrients essential to the growth of plants, specifically to binders which are useful in the process of granulation of fertilizers.

BACKGROUND OF THE INVENTION

To grow properly, plants need nutrients (nitrogen, potassium, calcium, zinc, magnesium, iron, manganese, etc.) which normally can be found in the soil. Sometimes fertilizers are needed to achieve a desired plant growth as these can enhance the growth of plants.

This growth of plants is met in two ways, the traditional one being additives that provide nutrients. The second mode by which some fertilizers act is to enhance the effectiveness of the soil by modifying its water retention and aeration. Fertilizers typically provide, in varying proportions, three main macronutrients:

Nitrogen (N): leaf growth;
Phosphorus (P): Development of roots, flowers, seeds, fruit;
Potassium (K): Strong stem growth, movement of water in plants, promotion of flowering and fruiting;
three secondary macronutrients: calcium (Ca), magnesium (Mg), and sulphur (S);
micronutrients: copper (Cu), iron (Fe), manganese (Mn), molybdenum (Mo), zinc (Zn), boron (B), and of occasional significance there are silicon (Si), cobalt (Co), and vanadium (V) plus rare mineral catalysts.

The most reliable and effective way to make the availability of nutrients coincide with plant requirements is by controlling their release into the soil solution, using slow release or controlled release fertilizers.

Both slow release fertilizers (SRF) and controlled release fertilizers (CRF) supply nutrients gradually. Yet, slow release fertilizers and controlled release fertilizers differ in many ways: The technology they use, the release mechanism, longevity, release controlling factors and more.

Solid fertilizers include granules, prills, crystals and powders. A prilled fertilizer is a type of granular fertilizer that is nearly spherical made by solidifying free-falling droplets in air or a fluid medium. Most controlled-release fertilizers (CRFs) used in commercial nurseries are prilled fertilizers that have been coated with sulfur or a polymer. These products have been developed to allow a slow release of nutrients into the root zone throughout crop development.

Nutrients are released out of coated fertilizer prills through osmosis at a rate that is positively correlated with increased temperature. The release rates are associated with the type and/or thickness of the coating on the fertilizer prill granule.

CRF fertilizers are available with different longevities. Most manufacturers have products with 3, 6, 9, or 12-month release periods. Products with different longevities are manufactured by blending fertilizer prills of different coating thicknesses: the thinner coated prills release nutrients first and then the thicker-coated prills release nutrients later. Short-term crops such as annuals would probably require 3-month release products and longer-term crops such as woody perennials would require fertilizer products with a 12-month release period.

Since powdered or crystalline fertilizer materials give rise to a lot of dust, with all the attendant loss and nuisance (dust emission during handling at ports and in warehouses and workplaces, poor product flowability, caking tendency during storage and transportation, segregation of components, scattering by wind during the spreading on the fields), most fertilizers are consolidated into larger particles with more suitable properties by means of different processes, commonly named "granulation".

Three different methods are usually used to enlarge the fertilizer powders and to produce granules:

the wet granulation method, named also pan granulation method or tumble agglomeration method. The fertilizer powders are enlarged by the chemical reaction through the presence of a liquid medium or by a binder. It produces the granular compound fertilizer where all the ingredients are incorporated into the formulation before it is formed into granules, so each individual granule contains all of the nutrients in the correct ratio. The granulation is done either inside a drum granulator, or a pan granulator, or a mixergranulator. The main drawbacks of this granulation method are that it is expensive both to install (this process requires mainly a granulator, a dryer and a cooler) and, on account of the energy required for drying, to run as well; it is also rather lacking in flexibility, because changing the formulation entails stopping the plant to reset many of the process parameters, and that can take some time. Most manufacturers of compound fertilizers, therefore, have to restrict their product range to a few standard grades. The grades available on the market are in fact a compromise: they do not necessarily have the correct nutrient balance for all combinations of crop, soil and climate. The economics of farming is nowadays so finely balanced that there is a growing demand for small batches of custom-formulated fertilizers, but not at the inevitable high cost of producing them in a wet granulation plant.

an alternative which takes a certain popularity in the past compared to the wet granulation is the bulk-blending process. Here, a fertilizer is formulated by merely mixing together granules of the individual fertilizer materials. Individually, of course, the granules have very different nutrient contents. The mixtures may also segregate during loading and transport, further compounding the problem of uneven distribution. The main advantages of bulk blending are that it uses a cheap installation, it can quickly and easily be switched to make different grades over a wide range, and it can operate on a limited number of basic granular fertilizer materials, such as urea, DAP and granular potash, which are plentiful and therefore relatively cheap.

the third method is compaction-granulation process which has gained popularity in the recent years compared to both previous ones. It combines some of the advantages of both wet granulation and bulk blending. Many amorphous solid fertilizer materials, including some that are difficult to granulate by conventional means, can be consolidated in any desired proportions by the simple application of a mechanical pressure. No added moisture is required, so there is no need for a dryer (a large and expensive item of equipment in its own right) or its substantial energy requirement. Changing the formulation is a very quick and simple procedure. The technique may also be used to enlarge single materials, as potash (potassium chloride) in particular, which cannot be granulated by the conventional drum or pan granulation methods.

During the process of granulation, a binder is usually used. There are various reasons for using a binder in the granulation process:

To Achieve the Desired Final Dry Pellet Crush Strength

Achieving the appropriate dry crush strength is necessary to ensure the pellet is durable enough to survive all handling points prior to and during end product use. From screening and packaging, to shipping, distribution, and application, product breakage and dust needs to be kept at a minimum. A dry pellet crush strength that is too low will break up too easily, while a dry pellet crush strength that is too high won't break up easily enough, or will take too long to dissolve. Adjusting binder concentration, or testing different binders, can help to hit the target dry crush strength.

To Achieve the Desired Green Strength

Oftentimes, materials need to be able to hold up as they move throughout the process prior to drying. A material with a green strength that is too low has the potential to break up as it drops off of conveyors or goes through chutes. Achieving the appropriate green strength will help the product to stay intact through the end of the process.

To Assist in the Actual Granulation Process

A binder helps to achieve the tackiness needed for a material to stick to itself. Though some materials may agglomerate without a binder, most materials require some sort of binder to pull and hold particles together while forming the pellets. And while ideally water will do the job, many times it does not have the tackiness to give the pellet enough wet strength to hold up to the rolling, tumbling, and dropping a pellet is exposed to.

If a proper balance of fertilizer chemistry, binder, and raw material size balance is not met, granules which are formed during granulation are often weak and readily disintegrate to powder during handling and use. Dustiness in the product can become excessive, causing extreme handling and flow problems during transfer and in fertilizer application equipment. Certain other raw materials and raw material combinations, when used at the most economically desirable levels, draw excessive moisture to the finished granules, thus limiting storage and shelf life and causing excessive caking in storage bins, finished product piles, and fertilizer application equipment. One class of such ingredient which may be used in combination with ammonium sulfate, and which frequently exhibits this characteristic, is urea and urea combinations. A granular urea-containing composition encompassing calcium sulfate and calcium phosphate is taught in U.S. Pat. No. 4,283,423. Various possibilities have been proposed to avoid such caking when utilizing urea in fertilizer manufacture. They include "dusting" a conditioning agent on the manufactured granule. Such dusting agents include starch, clays, and calcium sources, as described in U.S. Pat. No. 3,332,827.

SUMMARY OF THE INVENTION

According to some demonstrative embodiments disclosed herein, there is provided a granular fertilizer composition and methods for the preparation thereof.

According to some embodiments, the fertilizer composition as described herein may be in a shape of a granule and including one or more binders. According to some demonstrative embodiments, the process of preparation of the fertilizer granule may include using a fertilizer dust, fine or standard with one or more binders of the present invention.

According to some embodiments, the fertilizer may include Polysulphate™, PotashPlus™.

DETAILED DESCRIPTION OF THE INVENTION

According to some demonstrative embodiments disclosed herein, there is provided a granular fertilizer composition and methods for the preparation thereof.

According to some embodiments, the fertilizer composition as described herein may be in a shape of a granule and including one or more binders. According to some demonstrative embodiments, the process of preparation of the fertilizer granule may include using fine particles and/or a fertilizer dust with one or more binders of the present invention.

According to some embodiments, there is provided a granule including at least one fertilizer and at least one binder which is a geopolymer or a geopolymer like material.

According to some demonstrative embodiments, the granule of the present invention comprising the binder may have a strength of at least 2 kg/granule and preferably of at least 2.5 kg/granule and a strength after humidity of at least 0.2 kg/granule, preferably of at least 0.5 kg/granule, wherein after humidity refers to a granule being placed in a humidity chamber for 24 hours, and having 79% RH.

According to some demonstrative embodiments, the term "fertilizer" may include any material of natural or synthetic origin that is applied to soils or to plant tissues to supply one or more plant nutrients essential to the growth of plants, including, for example, Single nutrient ("straight") fertilizers such as Ammonium nitrate, Urea, calcium ammonium nitrate, superphosphate, e.g., "Single superphosphate" (SSP), phosphogypsum, Triple superphosphate (TSP) or a mixture thereof; Multinutrient fertilizers such as Binary (NP, NK, PK) fertilizers, e.g., monoammonium phosphate (MAP) and/or diammonium phosphate (DAP), NPK fertilizers which are three-component fertilizers providing nitrogen, phosphorus, and potassium; fertilizers which include one or more of the main micronutrients sources of iron, manganese, boron, molybdenum, zinc, and copper and the like; Compound fertilizers, e.g., which contain N, P, and K; Organic fertilizers such as peat, animal wastes, plant wastes from agriculture, and sewage sludge; and/or Other elements such as calcium, magnesium, and sulfur.

According to some embodiments, the fertilizer preferably includes one or more of nitrogen fertilizers such as ammonia, anhydrous ammonium nitrate, urea and sodium nitrate; Phosphate fertilizers; Potassium fertilizers, such as Potash, potassium chloride, potassium sulfate, potassium carbonate, or potassium nitrate According to some embodiments, the fertilizer is preferably Potash, Sulfates such as, SOP, Poly-sulfates: and in some embodiments may include Micronutrients such as Zn, B, Cu, Fe, Mo in a concentrations between 0.1-2%.

According to some embodiments, the fertilizer may include include 48% $SO_3$ as sulphate, 14% $K_2O$ as from sulphate of potash, 6% MgO as from magnesium sulphate and 17% CaO as from calcium sulphate (also known as Polysulphate™).

According to some embodiments, the fertilizer is preferably Potash, Phosphate and Phosphate derivatives, Calcium Phosphate, Magnesium Oxide, Ammonium Solphate, Potassium Nitrate, Potassium Solphate, Leonite, Urea, MonoamonniumPhosphate (MAP), DiAmoniumPhosphate (DAP), MonoPottasiumPhosphate (MKP).

According to some embodiments, the term "geopolymers" may include, for example, any suitable inorganic materials that form long-range, covalently bonded, non-crystalline (amorphous) networks, wherein the fundamental unit within a geopolymer structure is a tetrahedral complex consisting of Si or Al coordinated through covalent bonds to four oxygens.

Geopolymers comprise following molecular units (or chemical groups):
—Si—O—Si—O-siloxo, poly(siloxo)
—Si—O—Al—O-sialate, poly(sialate)
—Si—O—Al—O—Si—O-sialate-siloxo, poly(sialate-siloxo)
—Si—O—Al—O—Si—O—Si—O-sialate-disiloxo, poly(sialate-disiloxo)
—P—O—P—O-phosphate, poly(phosphate)
—P—O—Si—O—P—O-phospho-siloxo, poly(phospho-siloxo)
—P—O—Si—O—Al—O—P—O-phospho-sialate, poly(phospho-sialate)
—(R)—Si—O—Si—O—(R) organo-siloxo, poly-silicone
—Al—O—P—O-alumino-phospho, poly(alumino-phospho)
—Fe—O—Si—O—Al—O—Si—O-ferro-sialate, poly(ferro-sialate)

Geopolymers are presently developed and applied in 10 main classes of materials:

Waterglass-based geopolymer, poly(siloxonate), soluble silicate, Si:Al=1:0

Kaolinite/Hydrosodalite-based geopolymer, poly(sialate) Si:Al=1:1

Metakaolin MK-750-based geopolymer, poly(sialate-siloxo) Si:Al=2:1

Calcium-based geopolymer, (Ca, K, Na)-sialate, Si:Al=1, 2, 3

Rock-based geopolymer, poly(sialate-multisiloxo) 1<Si:Al<5

Silica-based geopolymer, sialate link and siloxo link in poly(siloxonate) Si:Al>5

Fly ash-based geopolymer

Ferro-sialate-based geopolymer

Phosphate-based geopolymer, AlPO4-based geopolymer

Organic-mineral geopolymer

According to some preferred embodiments, the fertilizer composition may include a mixture of Alginite of fly ash, Bentonite, Phosphate rock, a base, Metakaolin, and Water glass.

According to some demonstrative embodiments of the present invention there is provided a process for the granulation of a fertilizer including mixing fertilizer dust with one or more binders to provide a core mixture and granulating the core mixture using a wet granulation to provide stable fertilizer granules.

According to some embodiments, in the wet granulation, the granules may be formed by the addition of a granulation mix including the fertilizer dust and the binder onto a powder bed which is under the influence of an impeller (in a high-shear granulator), screws (in a twin screw granulator) or air (in a fluidized bed granulator).

According to some embodiments, the agitation resulting in the system along with the wetting of the components within the formulation results in the aggregation of the primary powder particles to produce wet granules of the fertilizer.

According to some embodiments, water mixed into the fertilizer powder may form bonds between the fertilizer particles that are strong enough to lock them together. However, once the water dries, the powder may fall apart. Therefore, water may not be strong enough to create and hold a bond and the binders of the present invention allow for the creation of a strong bond and resulting in a stable fertilizer granule.

According to some demonstrative embodiments, the granulation may take place using any suitable granulator or granulation method including, for example, Fluidized bed Granulation, Tumbling Granulation, Disc Granulation, Drum Granulation, Mixer-Granulation, Melt Granulation, Double shaft paddle Mixer-Granulation and the like.

According to some embodiments, the fertilizer dust is a potash dust, for example, potash dust which is a byproduct of the process of manufacturing potash.

According to these embodiments, the use of Potash dust may significantly increase the yield of potash production as usually it is cumbersome and difficult to make use of such dust.

According to these embodiments, combining the potash dust with a geopolymer provides a surprising effect of enhanced adherence, and accordingly enables for the granulation of the potash dust.

According to some demonstrative embodiments, the fertilizer composition of the present invention may also include one or more additional binders, e.g., in addition to the geopolymers. According to some embodiments, the one or more additional binders may include any suitable material or compound that may mechanically and/or chemically hold or draw other materials together to form a cohesive whole including, for example, organic or inorganic binders, such as, starch, bentonite, sodium silicate, lignosulfonates, molasses, hydrated lime, bitumen, Portland cement, clay, acids (nitric, hydrochloric, phosphoric, sulphuric), cellulose gum, sucrose, water, water glass, cements, or combinations thereof.

EXAMPLES

Example 1

Fill the Mixer with 2 Kg potash at temperature of 80° C.
2—Add 500 ppm of Ferric oxide.
3—Mix the material during 2 minutes 4000 rpm to destroy the agglomerates and have homogenous feed material.

Binder: Algenite (product of ICL)+Ca(OH)2+ZnO)

4—Add 4% W/W Alganite/potash in a vessel
5—Add 1% W/W Ca(OH)2/Potash
6—Add 1.2% W/W ZnO/(potash+binder)
7—Mix homogenously the solids
Note: The calculation of Alganite and Ca(OH)2 weight is relative to potash mass, whereas the mass of ZnO is added relative to overall mass including the binder in order to have Zn element of 1% at final product (for example: 2 Kg of potash, Alganite-80 g, Ca(OH)2-20 g and ZnO 25.2 g)
8—Add the mix to the potash and mix 1 minute at 4000 rpm.

9—Add 14-15% (from potash weight!) of hot water (80 degrees) to the mix and mix homogenously at 4000 rpm 5 minutes 10—Reduce the velocity to 500 rpm and continue mixing during 1 minutes approximately. (check the during the granulation the granules formation and add small quantities of water if necessary, 0-40 gr).

11—Empty the mixer and dry the material in fluid bed dryer at 150 degrees 20 minutes or an oven 150 degrees 180 min, mix it manually 12—Screen the material 2-4 mm (PSD of 1.4 mm-2 mm at maximum 5% and 4 mm-4.75 mm at maximum 5%).

Results: single strength 2 kg/gran. Single strength after humidity chamber 24 hours, 79% RH 0.5 kg/gran Example 2

Fill the Mixer with 2 Kg potash at temperature of 80° C.
2—Add 500 ppm of Ferric oxide.
3—Mix the material during 2 minutes 4000 rpm to destroy the agglomerates and have homogenous feed material.

Binder: $Ca(OH)_2$

5—Add 4% W/W(potash) of $Ca(OH)_2$
6—Add 1.2% W/W ZnO/(potash+binder)
7—Mix homogenously the solids Note: The calculation of $Ca(OH)_2$ weight is relative to potash mass, whereas the mass of ZnO is added relative to overall mass including the binder in order to have Zn element of 1% at final product.

8—Add the mix to the potash and mix 1 minute at 4000 rpm.

9—Add 14-15% (from potash weight!) of hot water (80 degrees) to the mix and mix homogenously at 4000 rpm 5 minutes 10—Reduce the velocity to 500 rpm and continue mixing during 1 minutes approximately. (check the during the granulation the granules formation and add small quantities of water if necessary, 0-40 gr).

11—Empty the mixer and dry the material in fluid bed dryer at 150 degrees 20 minutes or an oven 150 degrees 180 min, mix it manually 12—Screen the material 2-4 mm (PSD of 1.4 mm-2 mm at maximum 5% and 4 mm-4.75 mm at maximum 5%).

Results: single strength 2 kg/gran. Single strength after humidity chamber 24 hours, 79% RH 0.3 kg/gran Example 3—Fill the Mixer with 2 Kg potash at temperature of 80° C.

2—Add 500 ppm of Ferric oxide.
3—Mix the material during 2 minutes 4000 rpm to destroy the agglomerates and have homogenous feed material.

Binder: $Ca(OH)_2+KSiO_3+NaSiO_3$

4—Add 2.2% W/W $Ca(OH)_2$/potash
5—Add 1.5% W/W $KSiO_3$ 40%/potash
6—Add 0.5% W/W $NaSiO_3$ 40%/potash
7—Add 1.2% W/W ZnO/(potash+binder)
8—Mix homogenously the solids Note: The calculation of $Ca(OH)_2$ and the silicates weight is relative to potash mass, whereas the mass of ZnO is added relative to overall mass including the binder in order to have Zn element of 1% at final product.

9—Add the mix to the potash and mix 1 minute at 4000 rpm.

10—Add the additional water to get 14-15% in total (from potash weight!) of hot water (80 degrees) to the mix and mix homogenously at 4000 rpm 5 minutes 11—Reduce the velocity to 500 rpm and continue mixing during 1 minutes approximately. (check the during the granulation the granules formation and add small quantities of water if necessary, 0-40 gr).

12—Empty the mixer and dry the material in fluid bed dryer at 150 degrees 20 minutes or an oven 150 degrees 180 min, mix it manually 13—Screen the material 2-4 mm (PSD of 1.4 mm-2 mm at maximum 5% and 4 mm-4.75 mm at maximum 5%).

Results: single strength 2 kg/gran. Single strength after humidity chamber 24 hours, 79% RH 0.8 kg/gran Example 4

Fill the Mixer with 2 Kg potash at temperature of 80° C.
2—Add 500 ppm of Ferric oxide.
3—Mix the material during 2 minutes 4000 rpm to destroy the agglomerates and have homogenous feed material.

Binder: Starch+NaSiO3

4—Add 2.15% W/W Starch/(potash) to the potash and mix 1 minute at 4000 rpm

5—Add 0.5% W/W diluted NaSiO3/potash the water glass will be diluted according with the total water necessary to get 14-15% moisture.

6—Mix homogenously the mass at 4000 rpm.

7—Reduce the velocity to 500 rpm and continue mixing during 1 minutes approximately. (check the during the granulation the granules formation and add small quantities of water if necessary, 0-40 gr).

11—Empty the mixer and dry the material in fluid bed dryer at 150 degrees 20 minutes or an oven 150 degrees 180 min, mix it manually 12—Screen the material 2-4 mm (PSD of 1.4 mm-2 mm at maximum 5% and 4 mm-4.75 mm at maximum 5%).

Results: single strength 3 kg/gran. Single strength after humidity chamber 24 hours, 79% RH 0.2 kg/gran Example 5

Fill the Mixer with 2 Kg potash at temperature of 25° C.
2—Add 500 ppm of Ferric oxide.
3—Mix the material during 2 minutes 4000 rpm to destroy the agglomerates and have homogenous feed material.

Binder: Bentonite+NaSiO3+CaSO4

4—Add 0.5% W/W Bentonite/(potash) to the potash and mix 1 minute at 4000 rpm

5—Add 0.5% W/W CaSO4/(potash) to the potash and mix 1 minute at 4000 rpm

6—Add 2% W/W NaSiO3 40%/potash
7—Add additional water water to get 14-15% moisture.
8—Mix homogenously the mass at 4000 rpm.
9—Reduce the velocity to 500 rpm and continue mixing during 1 minutes approximately. (check the during the granulation the granules formation and add small quantities of water if necessary, 0-40 gr).

10—Empty the mixer and dry the material in fluid bed dryer at 150 degrees 20 minutes or an oven 150 degrees 180 min, mix it manually 11—Screen the material 2-4 mm (PSD of 1.4 mm-2 mm at maximum 5% and 4 mm-4.75 mm at maximum 5%).

Results: single strength 2.5 kg/gran. Single strength after humidity chamber 24 hours, 79% RH 0.1 kg/granule Example 6

Fill the Mixer with 2 Kg potash at temperature of 70° C.
2—Add 500 ppm of Ferric oxide.
3—Mix the material during 2 minutes 4000 rpm to destroy the agglomerates and have homogenous feed material.

Binder: Algenite

4—Add 8% W/W Algenite/potash to the potash and mix 1 minute at 4000 rpm
5—Add additional water water to get 14-15% moisture.
6—Mix homogenously the mass at 4000 rpm.
7—Reduce the velocity to 500 rpm and continue mixing during 1 minutes approximately. (check the during the granulation the granules formation and add small quantities of water if necessary, 0-40 gr).
8—Empty the mixer and dry the material in fluid bed dryer at 150 degrees 20 minutes or an oven 150 degrees 180 min, mix it manually
9—Screen the material 2-4 mm (PSD of 1.4 mm-2 mm at maximum 5% and 4 mm-4.75 mm at maximum 5%).

Results: single strength 4.3 kg/gran. Single strength after humidity chamber 24 hours, 79% RH 2.9 kg/granule Example 7

Fill the Mixer with 2 Kg potash at temperature of 25° C.
2—Add 500 ppm of Ferric oxide.
3—Mix the material during 2 minutes 4000 rpm to destroy the agglomerates and have homogenous feed material.

Binder: Algenite+Ca(OH)$_2$

4—Add 4% W/W Algenite/(potash) to the potash and mix 1 minute at 4000 rpm
5—Add 4% W/W Ca(OH)2/(potash) to the potash and mix 1 minute at 4000 rpm
6—Add additional water water to get 14-15% moisture.
7—Mix homogenously the mass at 4000 rpm.
8—Reduce the velocity to 500 rpm and continue mixing during 1 minutes approximately. (check the during the granulation the granules formation and add small quantities of water if necessary, 0-40 gr).
9—Empty the mixer and dry the material in fluid bed dryer at 150 degrees 20 minutes or an oven 150 degrees 180 min, mix it manually
10—Screen the material 2-4 mm (PSD of 1.4 mm-2 mm at maximum 5% and 4 mm-4.75 mm at maximum 5%).

Results: single strength 2.7 kg/gran. Single strength after humidity chamber 24 hours, 79% RH 1.4 kg/granule Example 8

Fill the Mixer with 2 Kg potash at temperature of 70° C.
2—Add 500 ppm of Ferric oxide.
3—Mix the material during 2 minutes 4000 rpm to destroy the agglomerates and have homogenous feed material.

Binder: Algenite

4—Add 6% W/W Algenite/potash to the potash and mix 1 minute at 4000 rpm
5—Add additional water water to get 14-15% moisture.
6—Mix homogenously the mass at 4000 rpm.
7—Reduce the velocity to 500 rpm and continue mixing during 1 minutes approximately. (check the during the granulation the granules formation and add small quantities of water if necessary, 0-40 gr).
8—Empty the mixer and dry the material in fluid bed dryer at 150 degrees 20 minutes or an oven 150 degrees 180 min, mix it manually
9—Screen the material 2-4 mm (PSD of 1.4 mm-2 mm at maximum 5% and 4 mm-4.75 mm at maximum 5%).

Results: single strength 2.6 kg/gran. Single strength after humidity chamber 24 hours, 79% RH 1.6 kg/granule While this invention has been described in terms of some specific examples, many modifications and variations are possible. It is therefore understood that within the scope of the appended claims, the invention may be realized otherwise than as specifically described.

The invention claimed is:

1. A fertilizer granule comprised of potash and one or more geopolymer binders wherein said granule comprises a single strength of at least 2.5 kg/granule and a single strength after being placed in a humidity chamber for 24 hours, and having 79% RH of at least 0.5 kg/granule; wherein all of said potash in said granule consists of 100% w/w potash dust.

2. The granule of claim 1, further comprising one or more additional organic or inorganic binders.

3. The granule of claim 2, wherein said one or more additional binders is, selected from the group consisting of starch, bentonite, sodium silicate, lignosulfonates, molasses, hydrated lime, bitumen, Portland cement, clay, acids, cellulose gum, sucrose, water, water glass, cements, and combinations thereof.

4. The granule of claim 2, wherein said one or more additional binders comprises an acid selected from the group consisting of nitric, hydrochloric, phosphoric and sulphuric.

5. The granule of claim 1, further comprising micronutrients selected from the group consisting of Zn, B, Cu, Fe, and Mo.

6. The granule of claim 5, wherein said micronutrients are in a concentration between 0.1-2%.

7. The granule of claim 1, wherein said geopolymer is fly ash.

8. A process for the production of a fertilizer granule comprising:
Mixing potash with a geopolymer binder to provide a fertilizer mix;
Wetting the fertilizer mix with water; and
Using wet granulation to form stable fertilizer granules, wherein all of said potash in said granule consists of 100% w/w potash dust.

9. The process of claim 8, wherein said geopolymer is fly ash.

* * * * *